United States Patent [19]
Ershov

[11] Patent Number: 5,917,849
[45] Date of Patent: Jun. 29, 1999

[54] LINE NARROWING DEVICE WITH DOUBLE DUTY GRATING

[75] Inventor: Alexander I. Ershov, San Diego, Calif.

[73] Assignee: Cymer, Inc., San Diego, Calif.

[21] Appl. No.: 08/926,946

[22] Filed: Sep. 10, 1997

[51] Int. Cl.⁶ ........................................... H01S 3/08
[52] U.S. Cl. ............................................... 372/102
[58] Field of Search ..................... 372/32, 100, 102, 372/106

[56] References Cited

U.S. PATENT DOCUMENTS

| | | | |
|---|---|---|---|
| 5,150,370 | 9/1992 | Furuya et al. | 372/106 |
| 5,559,816 | 9/1996 | Basting et al. | 372/102 |

OTHER PUBLICATIONS

Littman, Michael G. and Metcalf, Harold J., "Spectrally narrow pulsed dye laser without beam expander", Applied Optics, vol. 17, No. 14, Jul. 15, 1978, pp. 2224–2227.

Loree, T. R., Butterfield, K.B. and Barker, D. L., "Spectral tuning of ArF and KrF discharge lasers" Appl. Phys. Lett., 32(3), Feb. 1, 1978, pp. 171–173.

Sengupta, Uday K., "Krypton fluoride excimer laser for advanced microlithography", Optical Engineering, Oct. 1993, vol. 32 No. 10, pp. 2410–2420.

Trebino, Rick, Roller, James P. and Siegman, Anthony E., "A Comparison of the Cassegrain and Other Beam Expanders in High–Power Pulsed Dye Lasers", IEEE Journal of Quantum Electronics, vol. QE–18(8), pp. 1208–1213 (Aug. 1982).

*Primary Examiner*—Rodney Bovernick
*Assistant Examiner*—Robert E. Wise
*Attorney, Agent, or Firm*—John R. Ross, Esq.

[57] ABSTRACT

A line narrowing system in which a polarizing beam splitter, a polarization rotator and a reflecting optic are configured to cause light in an expanded beam from a laser gain medium to illuminate a grating at least twice in each pass through the line narrowing system before returning to the gain medium for further amplification. In a preferred embodiment, the grating is an echelle grating arranged in a Littrow configuration.

12 Claims, 3 Drawing Sheets

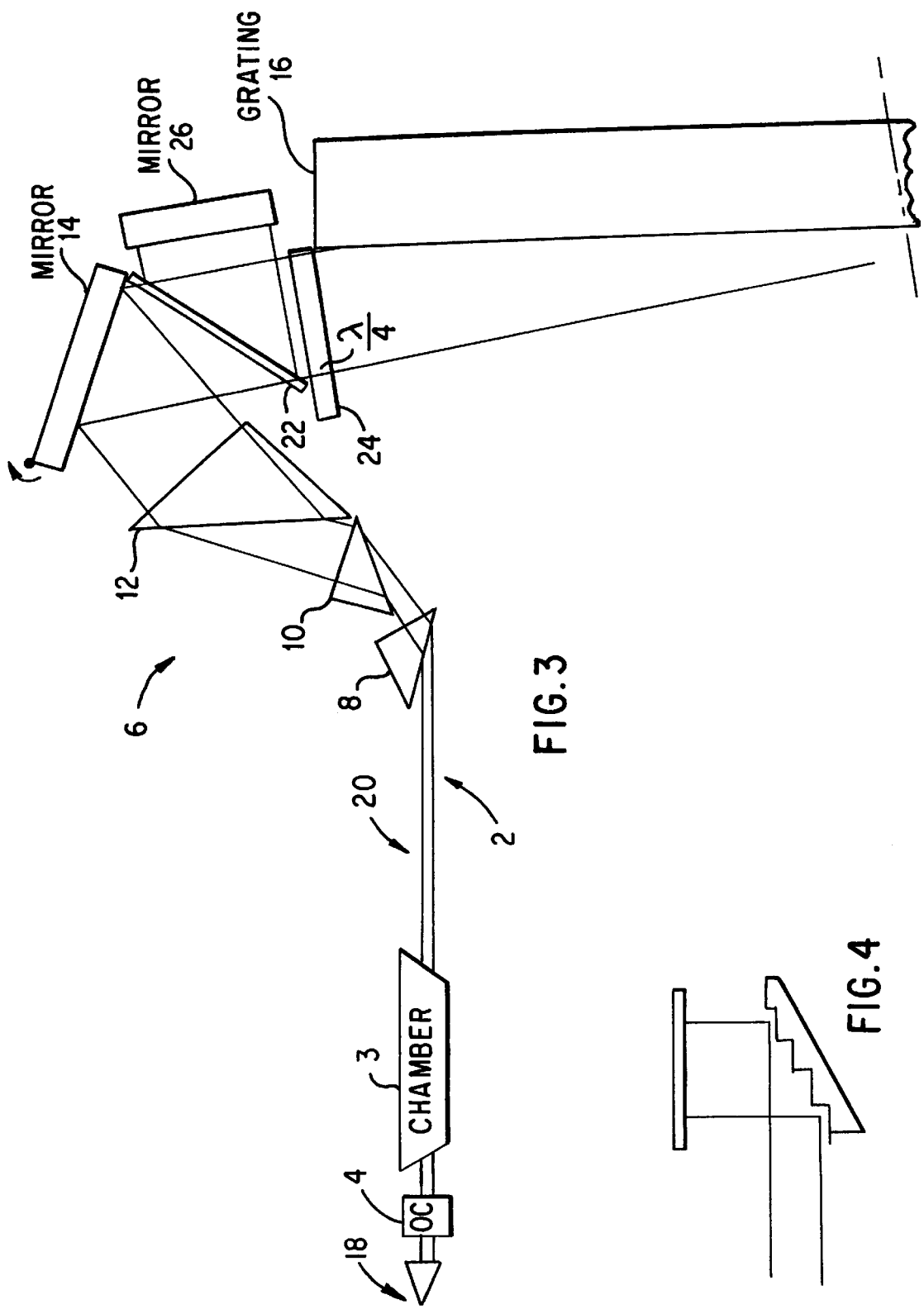

LINE NARROWING DEVICE WITH DOUBLE DUTY GRATING

This invention relates to devices for line narrowing lasers and especially to grating-based line narrowing devices.

BACKGROUND OF THE INVENTION

Techniques for Line Narrowing

Techniques for decreasing the bandwidth of the output of lasers are well known. Several such techniques used on excimer lasers are discussed by John F. Reintjes at pages 44–50 in *Laser Handbook*, Vol. 5, North-Holland Physics Publishing, Elsevier Science Publishers B.V. These techniques include the utilization of gratings, including echelle gratings, for wavelength selection. Use of beam expanding prisms ahead of the grating can increase the effectiveness of the grating.

A prior art technique for decreasing the bandwidth of a KrF excimer laser utilizes a line narrowing module with components shown at 6 in FIG. 1. The resonance cavity of excimer laser 2 is formed by an output coupler 4 (which is a 10 percent partially reflecting mirror) and echelle grating 16. A laser beam 20 (having a cross section of about 3 mm in the horizontal direction and 20 mm in the vertical direction) exits the rear of laser chamber 3. This portion of the beam is expanded in the horizontal direction by prisms 8, 10 and 12 and reflected off mirror 14 onto echelle grating 16. Mirror 14 is pivoted to select the narrow band output for laser 2. Grating 16 is arranged in a Littrow configuration so that the selected narrow band of wavelengths is reflected back off mirror 14 and back through prisms 12, 10 and 8 and into laser chamber 3 for amplification. Light at wavelengths outside the selected narrow band is disbursed so that this disbursed out-of-band light is not reflected back into the laser chamber. Typical KrF lasers operating in a pulse mode may have a gain region about 28 inches in length and produce pulses having a duration of about 15 to 30 ns. Thus, photons within the resonance cavity will make, on the average, about 2 to 4 round trips within the cavity. On each round trip, about 90 percent of the beam exits at the output coupler and about 10 percent is sent back for further amplification and line narrowing. The beam is repeatedly line narrowed as it passes through the line narrowing module.

With this prior art arrangement, the bandwidth of the KrF laser is reduced from its natural bandwidth of about 300 pm (full width half maximum or FWHM) to about 0.8 pm. Some applications of KrF lasers require greater narrowing of the bandwidth. Such applications include, for example, sub 0.25$\mu$ integrated circuit lithography which requires the bandwidth of 0.4 to 0.6 pm.

What is needed is an improvement to prior art line narrowing units which will provide greater narrowing of the bandwidth of laser beams.

SUMMARY OF THE INVENTION

The present invention provides a line narrowing system in which a polarizing beam splitter, a polarization rotator and a reflecting optic are configured to cause light in an expanded beam from a laser gain medium to illuminate a grating at least twice in each pass through the line narrowing system before returning to the gain medium for further amplification. In a preferred embodiment, the grating is an echelle grating arranged in a Littrow configuration.

BRIEF DESCRIPTION OF THE DRAWINGS

FIGS. 2 and 3 are drawings showing preferred embodiments of the present invention.

FIG. 4 shows an alternative grating configuration.

DETAILED DESCRIPTION OF PREFERRED EMBODIMENTS

Figure 2:
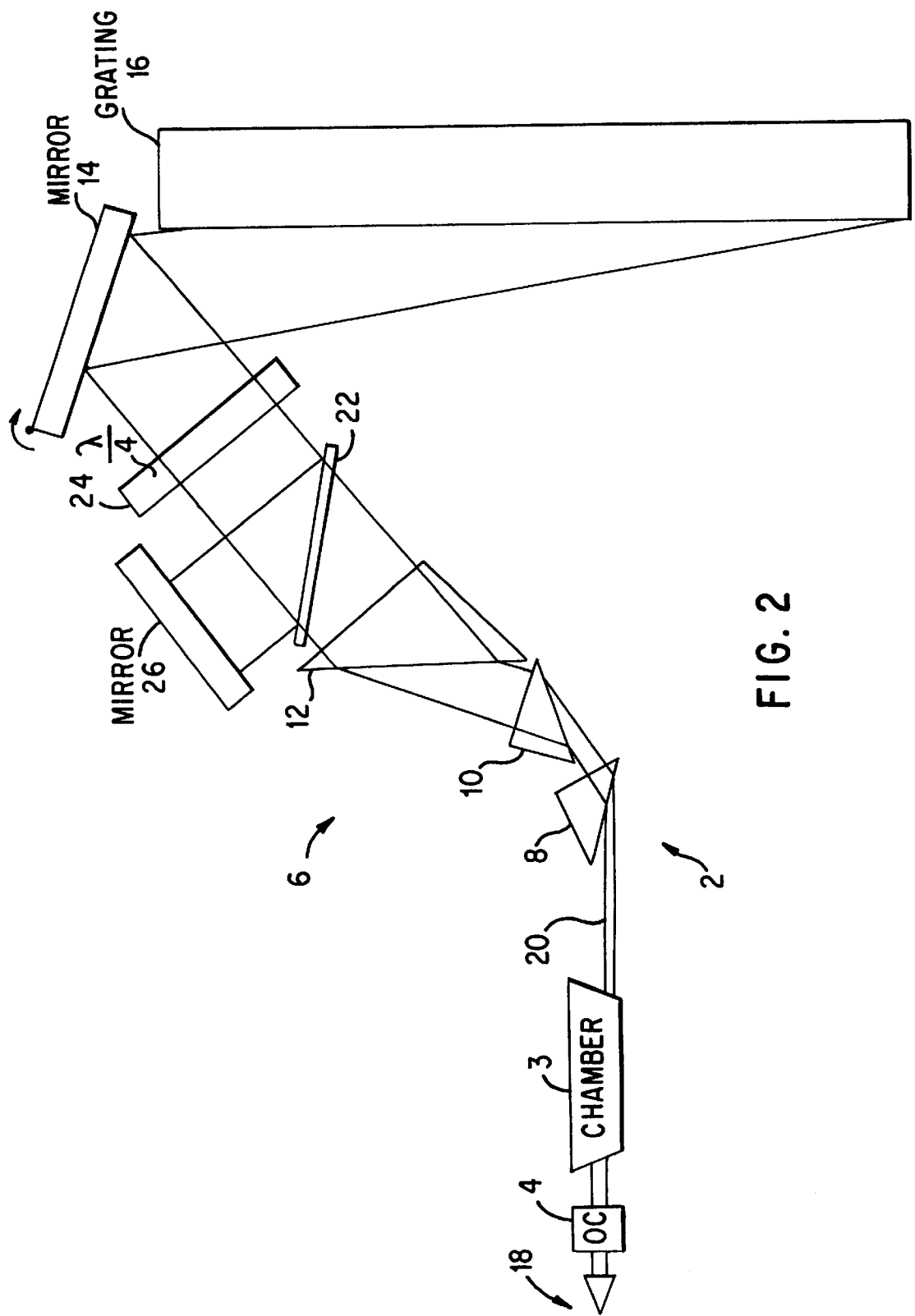

Preferred embodiments of the present invention are shown in FIGS. 2 and 3.

First Preferred Embodiment

Figure 1:
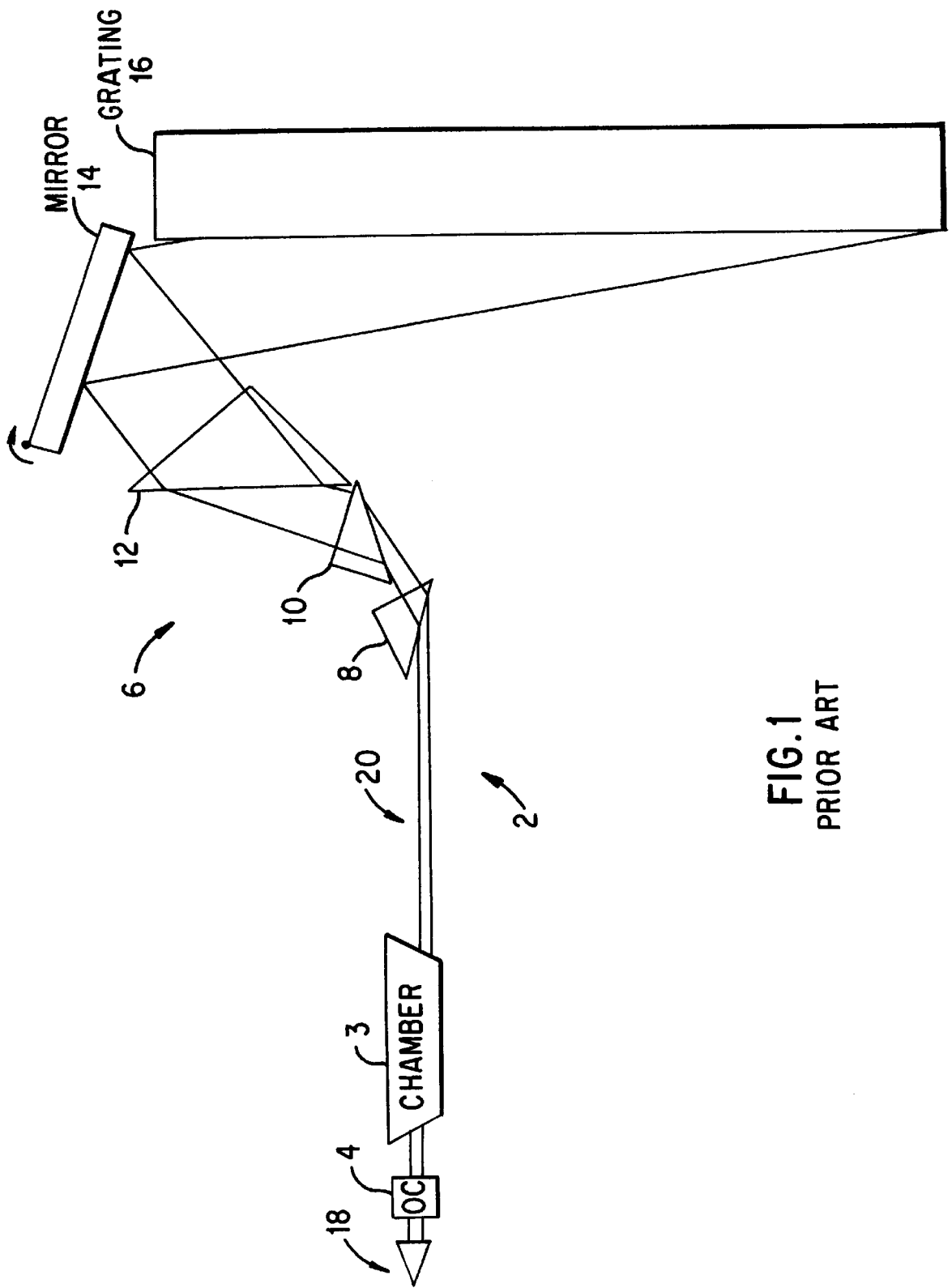
FIG. 1 shows a prior art line narrowing technique.

The arrangement shown in FIG. 2 is exactly the same as the prior art arrangement shown in FIG. 1 except for the addition between prism 12 and mirror 14 of a polarizing beam splitter 22, a fully reflecting mirror 26 and a quarter wave plate 24.

The rear window of laser chamber 30 is slanted at about 45 degrees in the horizonal direction and the front faces of beam expanding prisms 8, 10 and 12 are all slanted substantially in the horizonal direction. An effect of these slanted optical faces is that the beam exiting prism 12 in the direction of mirror 14 is polarized substantially in the horizonal direction.

Polarizing beam splitter 22 is oriented to pass horizontally polarized light and to reflect vertically polarized light. Therefore, the beam from laser chamber 3 passes through polarizing beam splitter 22 substantially undiminished. Then the light goes through polarization rotator 24 which, in this preferred embodiment, is a quarter wave plate. Quarter wave plate 24 converts the horizonally polarized light exiting prism 12 into a circular polarization. The circularly polarized beam reflects off mirror 14, grating 16, mirror 14 again and passes back through quarter wave plate 24 where the circularly polarized light is converted to a vertical polarization so that it reflects off polarizing beam splitter 26 toward totally reflecting mirror 22. The beam then reflects off mirror 26, reflects again off polarizing beam splitter 22 and passes through quarter wave plate 24 where it is again coverted into circularly polarized light. As before the beam reflects off mirror 14, grating 16, mirror 14 again and passes back through quarter wave plate 24. Another quarter wave rotation of the beam this time, however, converts the beam into horizonally polarized light which passes through polarizing beam splitter 22, prisms 12, 10 and 8 and back into laser chamber 3 for further amplification. (Note that on each reflection from grating 16, the beam is dispersed according to wavelength and that the position of mirror 14 is set so that only a selected narrow band of wavelength is directed back into laser chamber 3). In this arrangement, the reflectivity of the output coupler is higher than in the prior art laser in FIG. 1 and is about 20 percent, so that about 80 percent of the beam exits at the output coupler and 20 percent is reflected. Such higher reflection of the output coupler is designed to compensate for increased losses of light caused by double reflection from the grating. Thus, with this present embodiment the beam gets about twice as much line narrowing by grating 16 as the prior art arrangement shown in FIG. 1. The result is a substantial further reduction in the bandwidth with very little reduction in pulse energy.

The reflectivity of echelle diffraction gratings is polarization sensitive, the difference between horizontal and vertical polarizations typically being about 10 percent. This will cause some distortion at the circularly polarized light reflected from the grating which will allow a small portion of beam 28 to leak through polarizer 22 after the first reflection from grating 16. This is a minor effect and would not reduce the efficiency of double pass by more than 10 percent. Applicant estimates that overall reduction of the bandwidth from 0.8 pm in the prior art laser to 0.4–0.6 pm in the laser of the present invention.

Second Preferred Embodiment

A second preferred embodiment of the present invention is shown in FIG. 3. This embodiment is similar to the one shown in FIG. 2 except the polarizing beam splitter 22, the mirror 26 and the quarter wave plate 24 are located between mirror 14 and grating 16 instead of between prism 12 and mirror 14. The functioning of these optical elements is obvious form the above description.

The advantage of the second embodiment over the first is that in the second embodiment, reflections off mirror 14 is reduced by one-half. Also, wavelength tuning of the laser with mirror 14 is easier in this second preferred embodiment since the effect of a pivot adjustment of mirror 14 is not doubled by the doubled reflections off mirror 14.

Other Grating Configurations

The gratings in the preferred embodiments are all arranged in a Littrow configuration. Persons skilled in the art will recognize that this grating configuration could be replaced by other grating configurations, such as a grazing incidence grating configuration as shown in FIG. 4, in which a grating and a mirror are aligned to return a selected narrow range of wavelengths.

Although this very narrow band laser has been described with reference to a particular embodiment, it is to be appreciated that various adaptations and modifications may be made. For example, the techniques described for use on a KrF laser which operates at a nominal wavelength can also be applied to ArF lasers; however, the optics must be designed for 193 nm. The quarter wave plate could be replaced with a Faraday rotator. Therefore, the invention is only to be limited by the appended claims.

What is claimed is:

1. A line narrowing system for a laser comprising:
A. a dispersing optic comprising a grating;
B. a beam expanding optic for expanding a narrow laser beam to produce an expanded laser beam having a path oriented for illuminating said grating, said path defining a beam forward direction;
C. a polarizing beam splitter positioned across at least a portion of the path of said expanded laser beam;
D. a polarization rotator positioned across at least a portion of said expanded laser beam in a section of said beam path between said polarizing beam splitter and said grating;
E. a first reflecting optic positioned to reflect back toward said polarizing beam splitter light split off from the path of said expanded laser beam by said polarizing beam splitter,
wherein said polarizing beam splitter, said polarization rotator, said dispersing optic and said reflecting optic are arranged to cause at least a portion of light in said expanded beam to illuminate said grating at least twice in each pass through the line narrowing system.

2. A line narrowing system as in claim 1, wherein said dispersing optic is an echelle grating oriented in a Littrow configuration.

3. A line narrowing system as in claim 1, wherein said dispersing optic comprises a grating and a mirror, said grating and said mirror being oriented to reflect a portion of said expanded beam within a selected range of wavelengths in a direction opposite said forward beam direction.

4. A line narrowing system as in claim 1, wherein said polarization rotator is a quarter wave plate.

5. A line narrowing system as in claim 1, wherein said polarization rotator is a Faraday rotator.

6. A line narrowing system as in claim 1, wherein said first reflecting optic is a mirror.

7. A narrow band laser system comprising:
A. a laser chamber comprising a gain medium;
B. a line narrowing system for a laser comprising:
 a. a dispersing optic comprising a grating;
 b. a beam expanding otic for expanding a narrow laser beam to produce on expanded laser beam having a path oriented for illuminating said grating, said path defining a beam forward direction;
 c. a polarizing beam splitter positioned across at least a portion of the path of said expanded laser beam;
 d. a polarization rotator positioned across at least a portion of said expanded laser beam in a section of said beam path between said polarizing beam splitter and said grating;
 e. a first reflecting optic positioned to reflect back toward said polarizing beam splitter light split off from the path of said expanded laser beam by said polarizing beam splitter,
  wherein said polarizing beam splitter, said polarization rotator, said dispersing optic and said reflecting optic are arranged to cause at least a portion of light in said expanded beam to illuminate said grating at least twice in each pass through the line narrowing system.
C. an output coupler;
 said line narrowing system, said laser chamber and said output coupler being arranged to form a resonance cavity herein laser radiation is produced in said chamber, line narrowed in said line narrowing system and exists though said output coupler.

8. A line narrowing system as in claim 7, wherein said dispersing optic is an echelle grating oriented in a Littrow configuration.

9. A line narrowing system as in claim 7, wherein said dispersing optic comprises a grating and a mirror, said grating and said mirror being oriented to reflect a portion of said expanded beam within a selected range of wavelengths in a direction opposite said forward beam direction.

10. A line narrowing system as in claim 7, wherein said polarization rotator is a quarter wave plate.

11. A line narrowing system as in claim 7, wherein said polarization rotator is a Faraday rotator.

12. A line narrowing system as in claim 7, wherein said first reflecting optic is a mirror.

* * * * *